March 12, 1957  F. G. CLARK  2,784,821
REVERSIBLE OVERRUNNING CLUTCHES
Filed Feb. 17, 1954  4 Sheets-Sheet 1
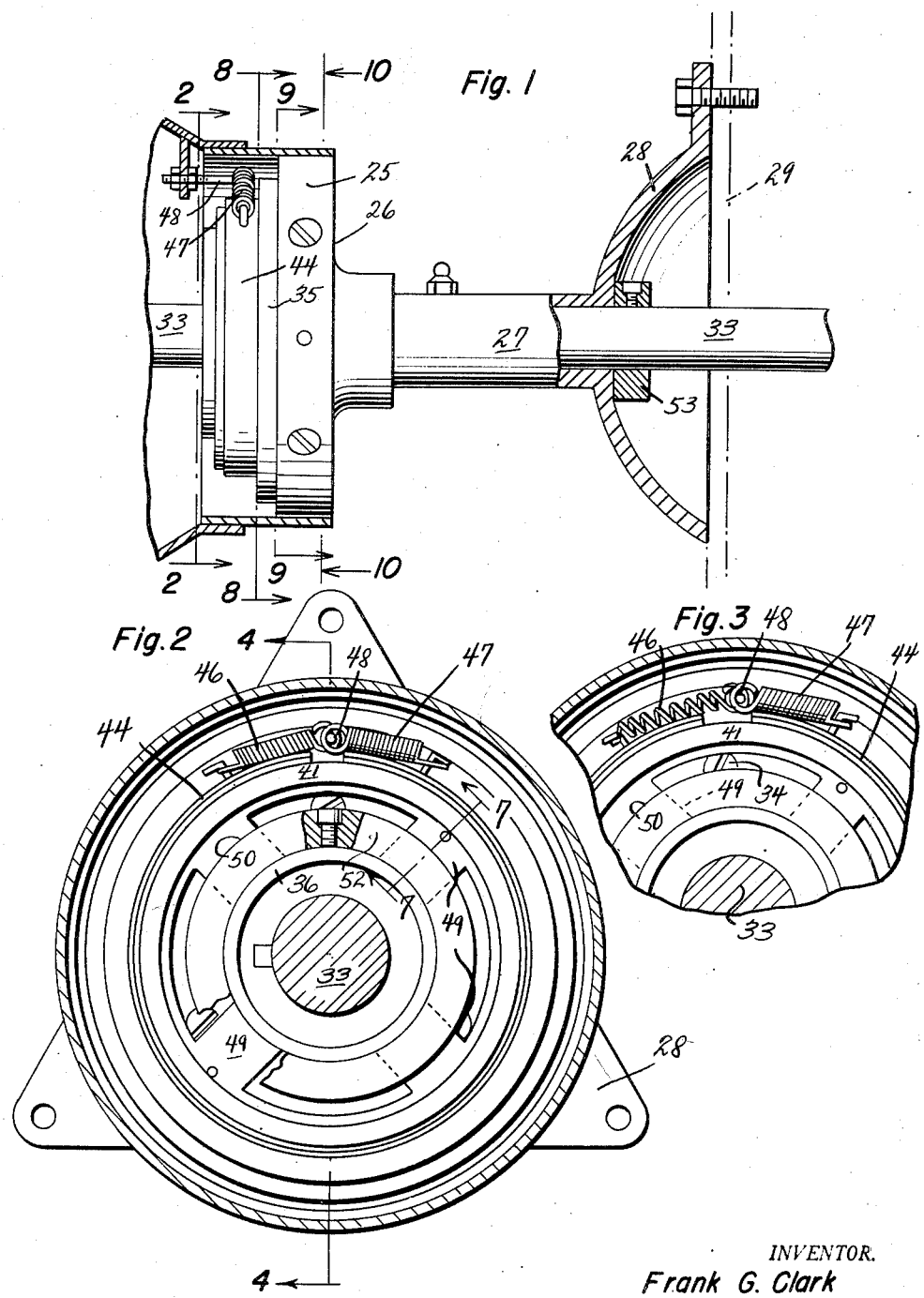
INVENTOR.
Frank G. Clark
BY Mawhinney & Mawhinney
ATTORNEYS March 12, 1957 F. G. CLARK 2,784,821
REVERSIBLE OVERRUNNING CLUTCHES
Filed Feb. 17, 1954 4 Sheets-Sheet 2
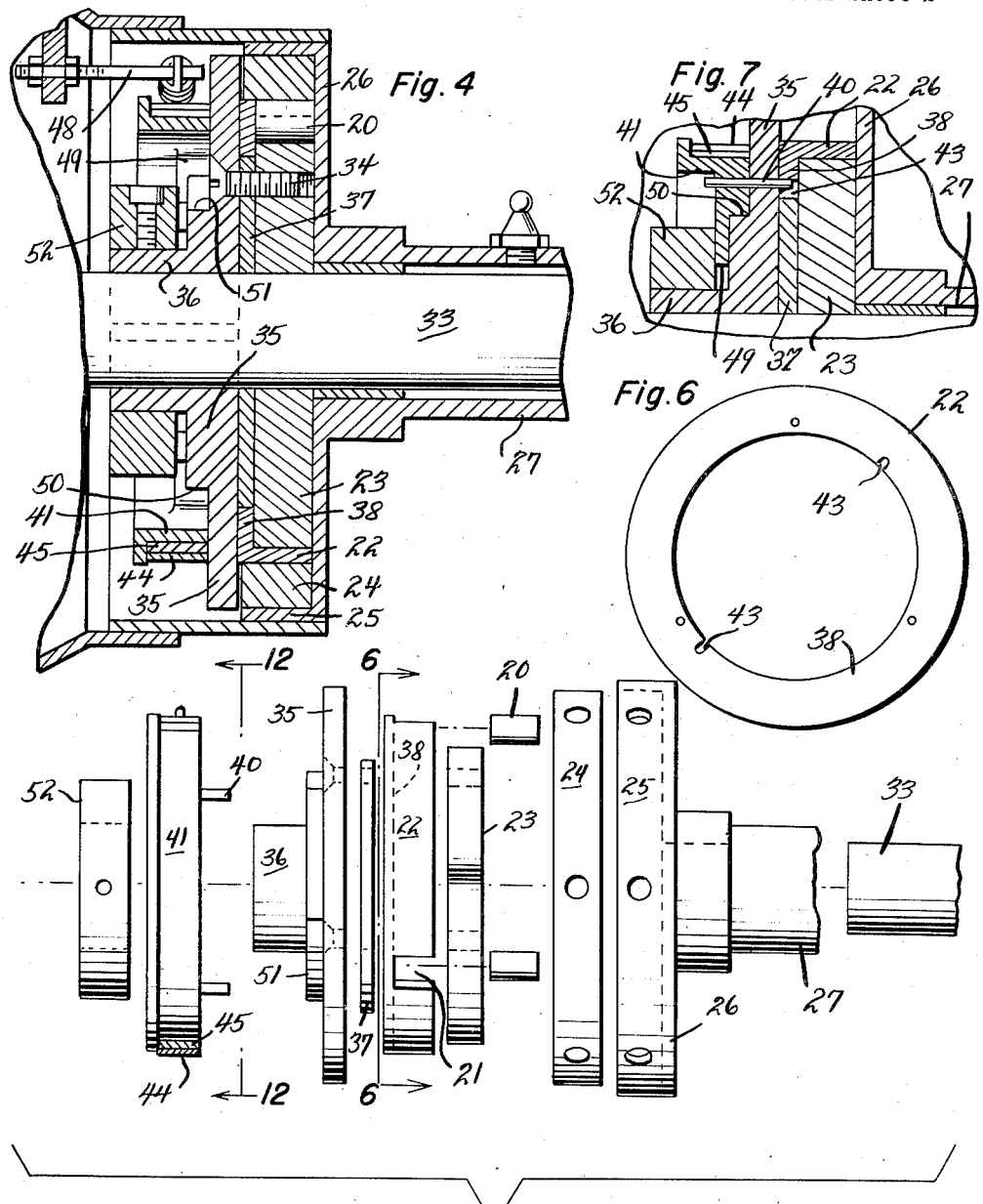
INVENTOR.
Frank G. Clark
BY Mawhinney & Mawhinney
ATTORNEYS March 12, 1957 F. G. CLARK 2,784,821
REVERSIBLE OVERRUNNING CLUTCHES
Filed Feb. 17, 1954 4 Sheets-Sheet 3

INVENTOR.
Frank G. Clark
BY Mawhinney & Mawhinney
ATTORNEYS

March 12, 1957 F. G. CLARK 2,784,821
REVERSIBLE OVERRUNNING CLUTCHES
Filed Feb. 17, 1954 4 Sheets-Sheet 4

INVENTOR.
Frank G. Clark
BY
Mawhinney & Mawhinney
ATTORNEYS

United States Patent Office 2,784,821
Patented Mar. 12, 1957

2,784,821

REVERSIBLE OVERRUNNING CLUTCHES

Frank G. Clark, Danvers, Mass.

Application February 17, 1954, Serial No. 410,912

3 Claims. (Cl. 192—44)

The present invention relates to improvements in reversible overrunning clutches and aims to provide an improved clutch capable of easy reversibility and providing for the overrunning of the driven member.

While the improved clutch may have many different applications, it will be found particularly useful in connection with a garden type tractor to enable such tractor to move forward or rearward and to idle in a neutral position of the clutch.

The invention also contemplates a roller type clutch between the drive and driven members in which the rollers are adapted to be moved into binding engagement with one member by a cam on the other member, with a cage for the rollers in fixed relation to a brake device whereby in the neutral position of the clutch the brake device will hold the cage against rotation and the rollers against revolution so that the cam may conveniently move relatively to the rollers for the purpose of better wedging the rollers into clutch-engaging position.

The invention also has for its further purpose to provide a brake drum which is entrained with the roller cage and while holding the cage initially against rotation during the clutching operation of the cam for either forward or reverse drive, is ultimately entrained for movement with the clutched drive and follower members so that the brake drum forcibly rotates within its lightly tensioned brake band without undue wear.

The invention has for its further object and purpose to provide duplex springs engageable with opposite ends of a split brake band, which springs are both in the neutral position under a light tension to subject the brake band to a light friction engagement with the brake drum, but on entrainment of the drum with the drive and follower members the forcible rotation of the brake drum within the brake band will act to initially angularly displace the brake band in the direction of motion so that the spring on that side will become abnormally distended while the companion spring connected to the other end of the brake band will be permitted to approach a more shut condition, thus creating a condition of unbalance between the springs; the arrangement being such that after the stretchable limit of the spring has been reached in relation to the friction grip of the brake band on the drum, the band will cease to be displaced while the brake drum continues to rotate with the driver and follower members; however, this unbalance condition will remain until the drive is suspended whereupon the unbalanced spring couple will tend to return the brake band and brake drum in the opposite direction and will tend to declutch the device.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevational view, with parts broken away and shown in section, of a reversible overrunning roller clutch constructed in accordance with the present invention;

Figure 2 is a vertical section taken on an enlarged scale on the line 2—2 in Figure 1;

Figure 3 is a similar section with parts broken away showing the brake band displaced and one of the springs abnormally stretched;

Figure 4 is a vertical longitudinal section taken on the line 4—4 of Figure 2;

Figure 5 is an exploded side elevational view of the several parts of the clutch;

Figure 6 is an end elevational view of the roller cage taken on line 6—6 in Figure 5;

Figure 7 is a fragmentary sectional view taken on the line 7—7 of Figure 2;

Figure 8:
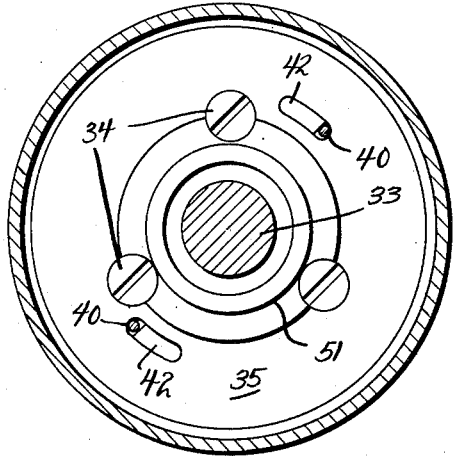
Figure 8 is a vertical sectional view taken on the line 8—8 in Figure 1.
Figure 9:
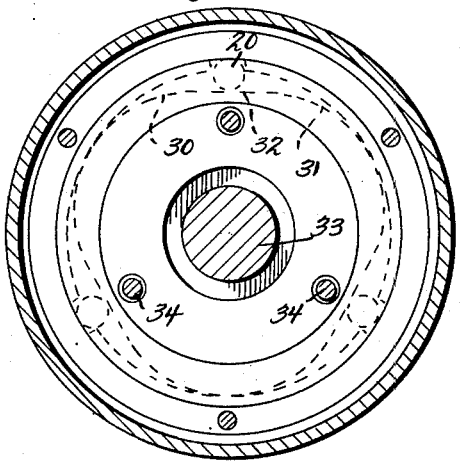
Figure 9 is a vertical sectional view taken on the line 9—9 in Figure 1.
Figure 10:
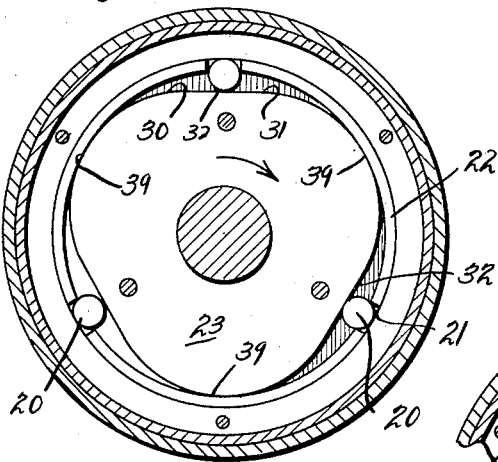
Figure 10 is a vertical sectional view taken on the line 10—10 in Figure 1.
Figure 12:
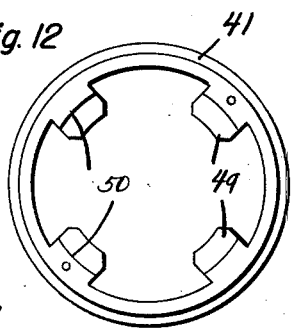
Figure 12 is an end elevational view of a form of brake drum employed.
Figure 11:
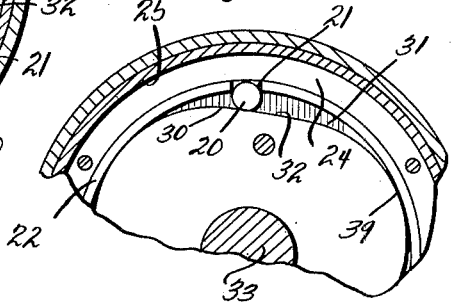
Figure 11 is a similar view with parts broken away and the clutch engaged in one position.

Referring more particularly to the drawings, 20 designates rotary and revoluble rollers rotatable about their own axes in pockets 21 of a ring cage 22 and revoluble with the cage in its floating or relative rotary movement with respect to the driver and follower members.

A rotary cam 23 on the driver when rotated in either forward or reverse direction will shift the rollers 20 radially out in the pockets 21 into jamming or clutched engagement with a follower ring 24 by which the follower member is entrained to rotate with the driver member. Such follower ring 24, which may be in the nature of a wear ring, is removably fitted within a flange 25 of a follower disc 26 in driving relation through a tubular follower shaft 27 with a spider 28 adapted to be bolted or otherwise affixed to a wheel 29 of the tractor or other vehicle driven by the clutch.

The cam 23, ring cage 22 and follower ring 24 are concentrically arranged with the rollers 20 of larger diameter than the radial thickness of the cage 22 to enable outer peripheral surfaces of the rollers to encounter the follower ring 24 while inner diametrically opposite peripheral surfaces of the rollers 20 bear on the cam surfaces of which there are two high points or lobes 30 and 31 at opposite sides of an intermediate low point 32 for each roller 20, of which by way of example there are three.

The cam 23 is driven from a shaft or axle 33 which may form a support for the tubular follower shaft 27 and on which the wheels 29 of the vehicle may be freely mounted. In the embodiment illustrated the cam 23 is affixed by screws 34 or the like to a drive disc 35 having a hub 36 keyed or otherwise affixed to the drive shaft 33, which latter is driven by the tractor engine (not shown) through any conventional form of transmission.

A spacer plate 37 interposed between the cam 23 and drive disc 35 and of less diameter than the cam 23 affords an annular channel outwardly of the spacer plate 37 in which to receive an inturned flange 38 on the drive side of the cage 22 which flange 38 fits freely in the channel for relative rotation of both the driver and follower with respect to the roller ring cage 22 incident to clutching motions. The flange 38 also prevents disassembly of ring cage 22 from the driver when the follower is backed off or before it is in place. The ring cage 22 may be supported on the concentric bearing surfaces 39 of the cam 23 or through the inner edge of the flange 38 bearing on the outer edge of the spacer plate 37.

Pursuant to the invention some means is provided to retain the ring cage 22 against rotation during the initial angular movement of the driver member necessary to bind the rollers 20 between the driver and follower. By way of example one form of such means is illustrated to comprise pins 40 projecting out from a brake drum 41 through arcuate slots 42 in the drive disc 35 and into slots or openings 43 of substantially the same arcuate width as the external diameter of the pins 40 whereby the brake drum acting through the pins 40 will hold the ring cage 22 immovable.

A brake band 44 preferably having a suitable brake lining 45 imposes the necessary tension on the brake drum 41 through the load of coil or other springs 46, 47 the remote ends of which are affixed to opposite ends of the split brake band 44 while the proximate ends of the springs are anchored to a fixed pin 48 or the like carried by a part of the tractor.

For convenience the brake drum 41 is supported for free rotary movement by inwardly projecting webs 49 which bear upon the hub 36 with cut-back shoulders 50 riding freely on the outer bearing surface of a boss 51 on the drive disc 35. A set collar 52 on the hub 36 retains the webs 49 loosely in place to permit rotation of the hub 36 and drive disc 35 relatively to the brake drum 41. A set collar 53 on the shaft 33 holds the follower shaft 27 and disc 26 and its flange in assembled position; although the wheel mount may serve this purpose without requiring a set collar at this point.

The screws 34 maintain a preselected angular relationship between the cam low points 32 and the arcuate slots 42 of the drive disc 35 while the springs 46, 47 maintain a balanced tension on the brake band 44 tending to pull the brake drum 41, when released from drive torque, to an intermediate or neutral position where the drum pins 40 occupy central portions of the arcuate slots 42 of the drive disc 35. This will permit the drive disc 35 to be driven selectively in either a forward or reverse direction through an angular distance corresponding to one-half the lengths of arcuate slots 42 while the pins 40, ring cage 22, and rollers 20 are held stationary due to the tension of the brake band 44 on the brake drum 41 by which the pins 40 are carried. Thus the rollers 20 can rotate but not revolve while the cam 23 is rotated from low points 32 to either high points 30 or 31 dependent upon the direction of rotation of the drive shaft 33. The distance from low to high points of the cam 23 may be approximately equal to one-half the lengths of the arcuate slots 42 although the slots may be longer so as not to interfere with a good binding action of the rollers 20 upon the driver cam 23 and follower ring 24 attained when either high points 30 or 31 are brought radially in alignment with the rollers 20.

Figure 15:
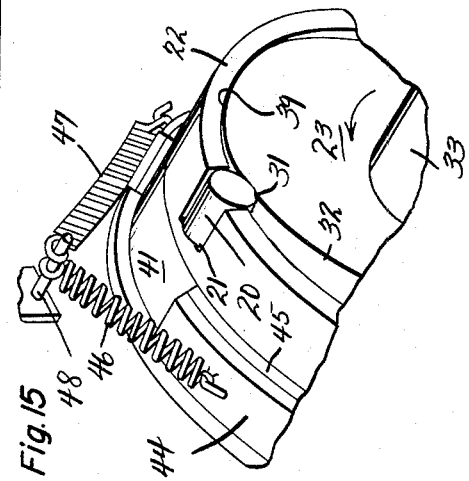
Figure 15 is a similar view of the upper portion of Figure 14 on an enlarged scale showing the abnormally stretched condition of one spring incident to the clutched position of the parts.
Figure 13:
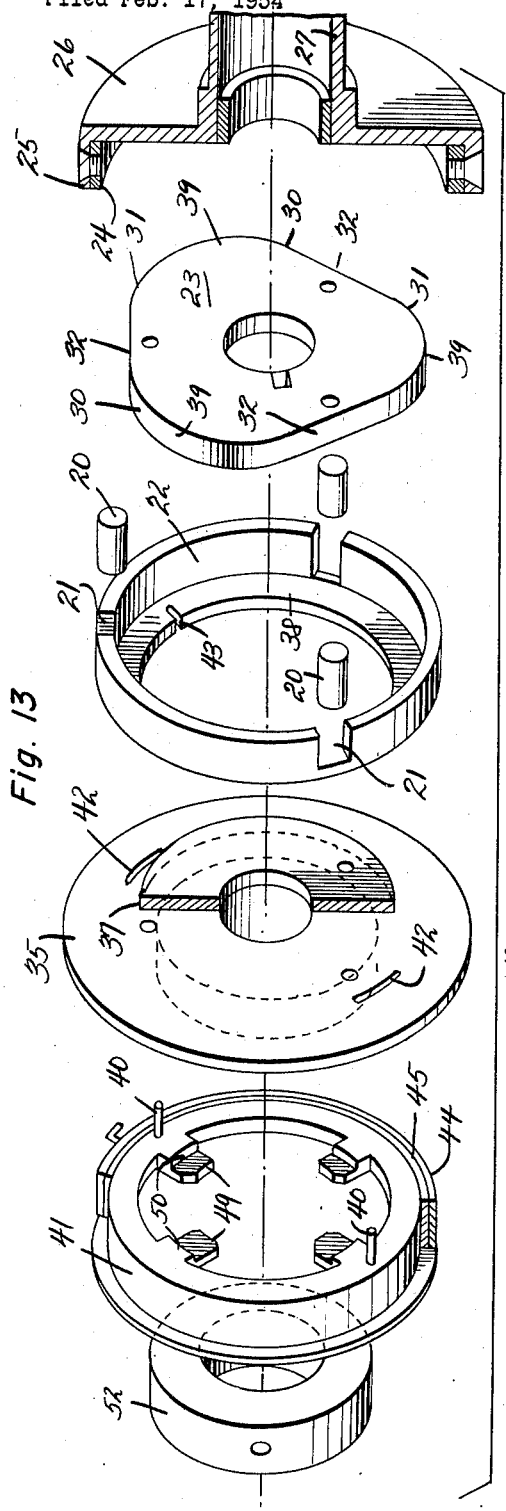
Figure 13 is an exploded perspective view of the several parts of the clutch.
Figure 14:
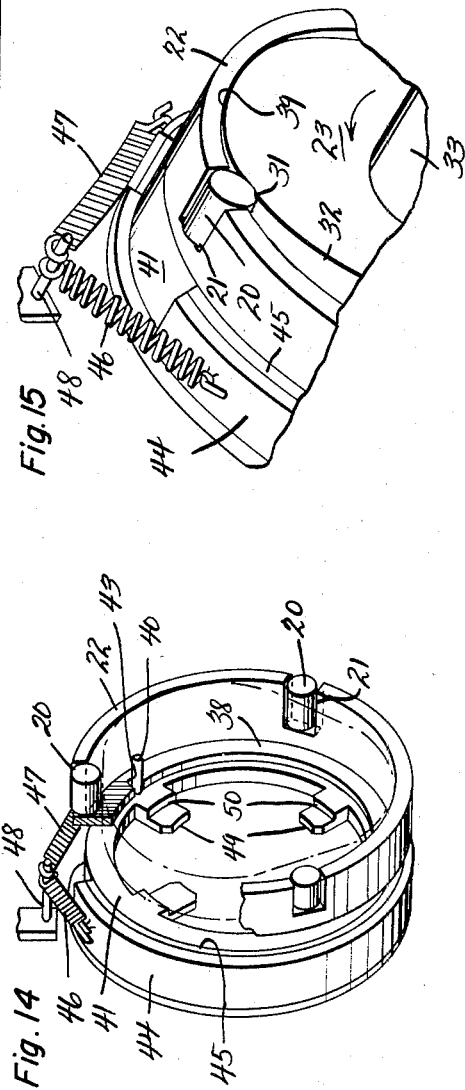
Figure 14 is a perspective view, with the roller cage shown in section and the brake band and springs under normal load or tension while the clutch is disengaged.

When so clutched the rollers 20, cage 22, pins 40 and drum will all be entrained with the interlocked driver and follower members and will be rotated therewith which will involve the rotation of the brake drum 41 within the brake band 44. Due to the friction grip of the band 44 on the rotating drum 41 the band 44 will be displaced from its neutral position with one spring 46 (Fig. 15) distended beyond normal or placed under potential energy while the companion spring 47 is released from its normal tension and permitted to assume a shut or more closed condition. It will be understood that in the normal position of the brake band 44 and springs 46, 47, that is when the pins 40 occupy the central portions of arcuate slots 42, both springs (Fig. 14) will be under light tension sufficient to impose load on the brake drum to prevent its rotation while the cam 23 is being rotated through the requisite angular distance to force out the rollers 20 into binding engagement with follower ring 24. Then when entrainment of follower with driver occurs the brake drum 41 is compelled to rotate therewith within the brake band 44 regardless of the light tension thereof. Incident to this rotation of the brake drum 41 the band 44 will be angularly displaced in one or the other direction dependent on the forward or reverse direction of the drive which will result in the further stretching of one or the other of the springs 46 or 47 and the slackening of the companion spring from its state of normal tension.

When the driving power stops the overrunning of the wheel and follower member will tend to immediately declutch the device, then the wheel can be moved in either direction. The abnormally distended spring will then tend to draw the brake band 44 back to neutral position, rotating therewith the brake drum 41, pins 40 and entrained roller cage ring 22 and restoring pins 40 to central positions in arcuate slots 42.

When freed of the drive and follower loads the abnormally distended spring will be free to contract and in so doing to so disturb and vibrate the entrained parts as to free the binding engagement of the rollers 20 with the driver and follower and thus permit the rollers 20 to slide down the inclined cam surfaces to the low points which declutches the device.

Although I have disclosed herein the best form of the invention known to me at this time, I reserve the right to all such modifications and changes as may come within the scope of the following claims.

What I claim is:

1. In a clutch, drive and follower members, rollers, a roller cage having pockets for the rollers, a cam on one member positioned for relative angular movement with respect to the cage to drive the rollers into driving relation with the members, a brake drum affixed to the cage, a brake band encircling the drum, and a pair of springs anchored at their proximate ends and secured at their remote ends to opposite ends of the brake band.

2. In a clutch, a drive disc having arcuate slots, a cam fixed to the disc, a pocketed cage floating about the cam, rollers in the pockets bearing at their inner portions on the cam, a follower outside the cage against which the rollers are adapted to bind, a brake drum, pins on the drum extending through and having a limited angular movement in the slots and affixed to the cage, a brake band about the drum, coil springs having outer ends connected to opposite ends of the brake band, and a fixed member to which the proximate ends of the springs are connected.

3. In a clutch, drive and follower members, rollers, a roller cage having pockets for the rollers, a cam on one member positioned for relative angular movement with respect to the cage to drive the rollers into driving relation with the members, a brake drum affixed to the cage, a brake band encircling the drum, and elastic members anchored at their proximate ends and secured at their remote ends to opposite ends of the brake band.

References Cited in the file of this patent

UNITED STATES PATENTS

| | | |
|---|---|---|
| 683,271 | Gibbs | Sept. 24, 1901 |
| 836,035 | Hendricks | Nov. 13, 1906 |
| 929,867 | Meisselbach et al. | Aug. 3, 1909 |
| 2,408,506 | Briskin | Oct. 1, 1946 |
| 2,510,447 | Wheat | June 6, 1950 |